Jan. 4, 1966   H. HOPFF ETAL   3,227,779
PHENYL ACETALDEHYDE COMPOUNDS AS REGULATORS FOR
THE POLYMERIZATION OF UNSATURATED POLYESTER
RESINS WITH ETHYLENICALLY
UNSATURATED MONOMERS
Filed March 19, 1962   2 Sheets-Sheet 2
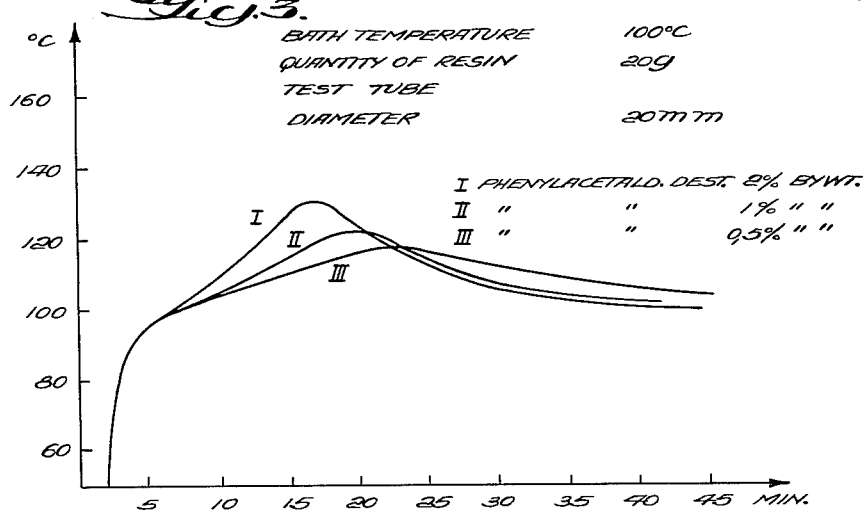
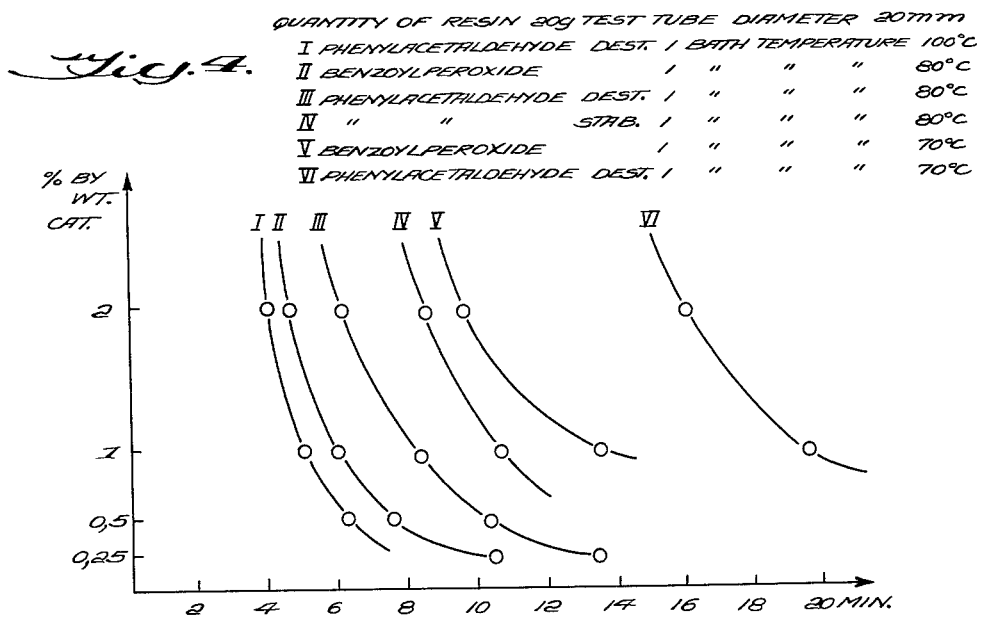
INVENTORS
HEINRICH HOPFF,
EDUARD KLEINER,
BY Bailey, Stephens & Huettig
ATTORNEYS 3,227,779
PHENYL ACETALDEHYDE COMPOUNDS AS REGULATORS FOR THE POLYMERIZATION OF UNSATURATED POLYESTER RESINS WITH ETHYLENICALLY UNSATURATED MONOMERS
Heinrich Hopff and Eduard Kleiner, Zurich, Switzerland, assignors to Deutsche Gold- und Silber-Scheideanstalt vormals Roessler, Frankfurt am Main, Germany
Filed Mar. 19, 1962, Ser. No. 182,705
Claims priority, application Germany, July 15, 1960, D 33,789; Mar. 18, 1961, D 35,690
11 Claims. (Cl. 260—861)

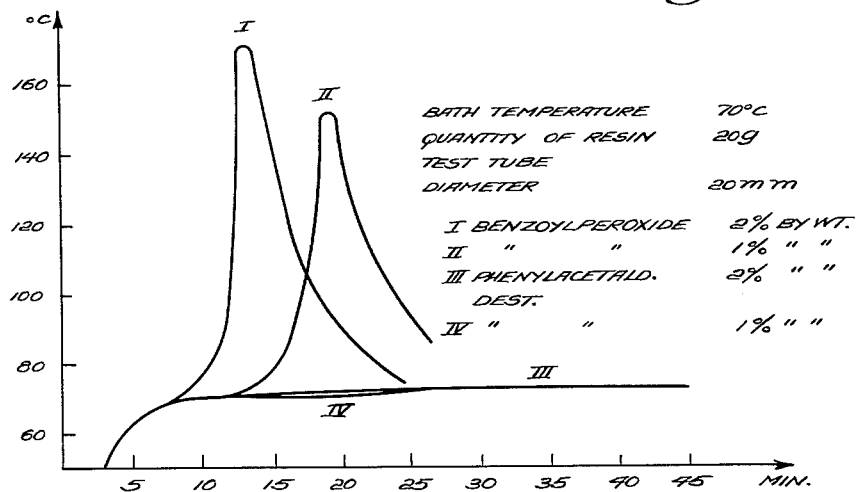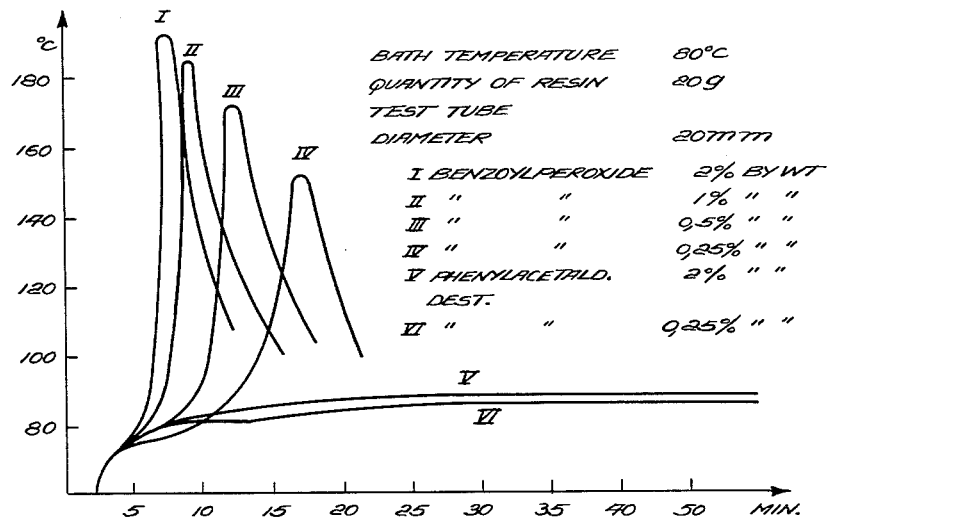

This application is a continuation-in-part of application Serial No. 123,544, filed July 12, 1961 now abandoned.

The present invention relates to an improved process for regulating the copolymerization of unsaturated polyester resins with ethylenically unsaturated monomers with the aid of phenyl acetaldehydes as polymerization regulators.

It is known that unsaturated polyesters derived from unsaturated dicarboxylic acids, such as maleic acid, itaconic acid, fumaric acid and the like, with glycols can be converted to cross-linked polymers by copolymerization with monomeric ethylenically unsaturated compounds such as styrene, acrylic esters, for example, methyl methacrylate, methyl acrylate, diallyl phthalate, triallyl cyanurate and the like, with the aid of peroxidic catalysts, such as benzoyl peroxide, cumene hydroperoxide, cyclohexyl hydroperoxide and the like. Copolymers of this type have found many technical uses, especially in combination with glass fibers. In general, they possess good mechanical properties but they do not fulfill all requirements with reference to impact strength.

The term polymerization regulators is employed herein to signify such compounds which steer the copolymerization in a different manner and way than the previously employed peroxides, for example, benzoyl peroxide. The difference in the manner the copolymerization is steered or regulated is most conspicuously noticeable in the properties of the copolymer products. Evidently the prominent property of the new polymerization regulators is the accelerating action thereof. Other valuable properties of the novel polymerization accelerators will become evident from the following.

The copolymerization according to the invention is effected between unsaturated polyester resins and liquid polymerizable monomers containing one or more terminal $CH_2=C<$ groups. Such polymerizable monomers, for instance, are vinyl esters, such as vinyl acetate, vinyl propionate, vinyl ethers, such as vinyl methyl ether, acrylic and methacrylic acid esters, such as their methyl, ethyl and butyl esters, acrylonitrile, butadiene, 2-chlorobutadiene, diallyl maleate and especially aromatic vinyl compounds, such as styrene. The aromatic aldehydes employed according to the invention are particularly effective in steering and accelerating the copolymerization of unsaturated polyesters with styrene and substituted styrenes, such as vinyl toluenes and vinyl ethyl benzenes, as the monomer and simultaneously as the solvent.

The polyester resins which can be copolymerized according to the invention with the ethylenically unsaturated monomers can be all polymerizable unsaturated polyesters derived from dibasic carboxylic acids and polyhydric alcohols, at least one of the carboxylic acid or polyhydric alcohol components being unsaturated. Examples of dicarboxylic acids which can serve as the acid components of the polyesters, for example, are succinic acid, adipic acid, terephthalic acid, phthalic acid, as well as the unsaturated dicarboxylic acids, maleic acid, itaconic acid, fumaric acid, tricarballyl acid and the like.

The alcoholic components of the polyesters can include glycol, ethylene glycol, di- and triethylene glycol, trimethylene glycol, hexamethylene glycol, allyl alcohol, 2-butene-1,4 diol and the like. Of course, it is to be understood that such polyesters can be produced from the corresponding acid anhydrides, such as maleic anhydride, instead of the acids or corresponding mixed esters or ester mixtures.

The polymerization regulators according to the invention are phenyl acetaldehyde compounds of the following general formula

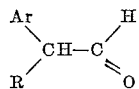

wherein Ar is phenyl or substituted phenyl group such as alkyl, alkyloxy and halogen substituted phenyl groups and R is hydrogen, alkyl or phenyl.

Examples of such compounds are phenyl acetaldehyde, p-methyl phenyl acetaldehyde, p-ethyl phenyl acetaldehyde, m- and p-chlorophenyl acetaldehyde, the α-methyl, ethyl or phenyl substituted phenyl acetaldehydes, especially hydratropaldehyde and diphenyl acetaldehyde. In contrast to the above phenyl acetaldehyde compounds which still retain 1 or 2 hydrogen atoms on the α carbon atoms, those not containing a hydrogen atom on the α carbon atom, such as in triphenyl acetaldehyde, or 2,4-diphenyl crotonaldehyde, that is, a phenyl acetaldehyde, the α carbon atom of which also carries the

substituent, are considerably less active. The activity of hydrocinnamic aldehyde as an accelerator is higher than that of the disubstituted phenyl acetaldehydes, such as triphenyl acetaldehyde. The accelerating action of hydratropaldehyde is greater than that of phenyl acetaldehyde and its substitution products in which the substituents are in the benzene nucleus.

The phenyl acetaldehyde regulating compounds according to the invention can be employed singly or in admixture with a peroxidic catalyst.

In the accompanying drawings:

FIG. 1 shows exotherm curves for copolymerization of a commercial unsaturated polyester resin with styrene mixture with various proportions of benzoyl peroxide and phenyl acetaldehyde at a bath temperature of 70° C.;

FIG. 2 shows exotherm curves for copolymerization of a commercial unsaturated polyester resin with styrene mixture with various proportions of benzoyl peroxide and phenyl acetaldehyde at a bath temperature of 80° C.;

FIG. 3 shows exotherm curves for copolymerization of a commercial polyester with styrene mixture with various proportions of phenyl acetaldehyde at a bath temperature of 100° C.;

FIG. 4 shows gel time curves for copolymerization of a commercial polyester resin with styrene mixture as a function of temperature and catalyst with phenyl acetaldehyde and benzoyl peroxide;

FIG. 5 shows gel time curves for copolymerization of a polyester resin with styrene as a function of quinone and hydroquinone as retarders with hydratropaldehyde and benzoyl peroxide as catalysts;

FIG. 6 shows exotherm curves for copolymerization of another polyester resin with styrene with various proportions of benzoyl peroxide and hydratropaldehyde at a bath temperature of 70° C.;

FIG. 7 shows exotherm curves for copolymerization of such other polyester resin with styrene with various proportions of benzoyl peroxide and hydratropalhedye at a bath temperature of 80° C.;

FIG. 8 shows exotherm curves for copolymerization of the same polyester resin as in FIGS. 1–5 with styrene with various phenyl acetaldehyde compounds as catalysts;

FIG. 9 shows exotherm curves for copolymerization of the same polyester as in FIGS. 1–5 with various proportions of hydratropaldehyde;

FIG. 10 shows a gel time curve for copolymerization of the same polyester as in FIGS. 1–5 with styrene as a function of various proportions of hydratropaldehyde;

FIG. 11 shows a heat temperature curve for the copolymerization of the same polyester as in FIGS. 1–5 with styrene as a function of various proportions of hydratropaledehyde; and FIG. 12 shows exotherm curves for copolymerization of the same polyester as in FIGS. 1–5 with styrene using hydratropaldehyde and benzoyl peroxide and mixtures thereof as catalysts.

The polyester upon which the curves in FIGS. 1–5 and 8–12 are based was prepared by heating a mixture of 1 mol of maleic acid anhydride, 1.6 mol of phthalic acid anhydride, 1.6 mol of ethylene glycol and 1 mol of diethylene glycol until the acid number reached 25.7. The polyester styrene mixture used was prepared by mixing 500 parts of such polyester with 250 parts of freshly distilled styrene. The acid number of the mixture was 17.2.

The polyester upon which the curves in FIGS. 6 and 7 were obtained contains maleic acid, orthophthalic acid and propylene glycol 1,2 in a molar proportion of 1:1:2. The polyester styrene mixture contained 30% of styrene and also contained 0.01% of hydroquinone as a stablizer. Its acid number was 20.

As can be seen from FIGS. 1–3, 6, 7 and 12, the progress of the copolymerization is fundamentally different when phenyl acetaldehyde compounds are used instead of benzoyl peroxide. With benzoyl peroxide the progress of the polymerization after gelation is almost explosive as can be seen from the steep temperature rise and high exotherm peak. In view of the large temperature differences within the polymerizate, cracked products are often obtained which in addition have a yellow cast and are brittle. When phenyl acetaldehyde compounds are used the polymerization of an unsaturated polyester styrene solution after gelation proceeds uniformly without temperature rises worth mentioning with the result that completely crack free products having a smooth surface are obtained which have a transparency and clarity comparable to those obtained with polymers of methacrylates. On the other hand, as can be seen from FIG. 4, the gel times of unsaturated polyester-styrene solutions catalysed with benzoyl peroxide and with phenyl acetaldehyde are very close to each other.

The phenyl acetaldehyde or its substitution products can be used in pure form or in ionone stabilized form. The stabilized form increases the gel time required for the polyester-styrene solutions somewhat.

The following Table 1 shows progress of the copolymerization of the same polyester-styrene mixtures concerned in FIGS. 1–5 of the drawings with various quantities of distilled and stabilized phenyl acetaldehyde and benzoyl peroxide as well as the aspect of the polymerizate produced and the following Table 2 compares several mechanical properties of the polymerizates thus obtained.

TABLE 1

Polymerization Progress

| Catalyst | Percent by wt. | Bath Temp., °C. | Gel Time, Min. | Peak Temp., °C. | Polymer |
|---|---|---|---|---|---|
| Phenylacetaldehyde distilled. | 2 | 70 | 16 | 72 | Water clear—crack free. |
|  | 1 | 70 | 19.4 | 72 | Do. |
|  | 2 | 80 | 6 | 87 | Do. |
|  | 1 | 80 | 8.5 | 85.2 | Do. |
|  | 0.5 | 80 | 10.5 | 85 | Do. |
|  | 0.25 | 80 | 13.5 | 84.5 | Do. |
|  | 2 | 100 | 4 | 131.5 | Water clear—cracked. |
|  | 1 | 100 | 5 | 123 | Water clear—crack free. |
|  | 0.5 | 100 | 6.25 | 118 | Do. |
| Phenylacetaldehyde stabilized with ionone. | 2 | 80 | 8.5 | 84.5 | Do. |
|  | 1 | 80 | 10.75 | 84 | Do. |
| Benzoyl-peroxide | 2 | 70 | 9.5 | 173 | Yellowish—crack free. |
|  | 1 | 70 | 13.5 | 153 | Do. |
|  | 2 | 80 | 4.5 | 192 | Yellowish—cracked. |
|  | 1 | 80 | 6 | 184 | Do. |
|  | 0.5 | 80 | 7.5 | 172 | Do. |
|  | 0.25 | 80 | 10.5 | 152 | Do. |

In this and in the succeeding tables the gel time signifies the time between the initiation of the polymerization and the point when the resulting gel upon withdrawal of a glass rod therefrom does not flow together and the peak temperature signifies the maximum temperature reached during the polymerization.

TABLE 2

Mechanical properties

| Polymerized with | 2% Phenylacet-aldehyde | 2% Benzoyl-peroxide |
|---|---|---|
| Impact strength: |  |  |
| (a) based on the cross-section | 11.2 cmkg./cm.² | 8.5 cmkg./cm.² |
| (b) based on the 6 fold moment of resistance. | 37.3 cmkg./cm.³ | 28.3 cmkg./cm.³ |
| Bending strength | 1630 kg./cm.² | 1750 kg./cm.² |
| Bending angle upon break | 21.8° | 18.2°. |

It will be seen from Table 1 that with phenyl acetaldehyde, products can be obtained at 70 to 100° C. which are water clear and crack free, whereas with benzoyl peroxide at 80° C. cracked products are always produced. In the last instance also the peak exotherm temperature is about 100° C. higher than when the phenyl acetaldehyde according to the invention is employed.

While the theoretical basis for the action of the phenyl acetaldehyde compounds employed according to the invention cannot be considered completely certain, it has been proved that the polymerization mechanism must be of radical nature.

Known inhibitors such as quinone and hydroquinone have an inhibiting or reaction retarding action upon copolymerizations carried out according to the invention. As can be seen from FIG. 5 in the drawings quinone has a stronger inhibiting effect than hydroquinone when hydratropaldehyde is used as the polymerization regulator. As also shown in such figure the inhibiting effect of quinone is stronger than that of hydroquinone in a peroxide catalysed copolymerization. The influence of these known reaction retarders in radical catalysis would seem to indicate that a radical controlled reaction mechanism must be involved with the regulators employed according to the invention.

The activity of various individual aldehydes is indicated in the following Table 3 using the polyester styrene mixture as in FIGS. 1–5. In this and in the scceeding Tables the hardening time signifies the time between the initiation of the polymerization and the point when the peak temperature is reached.

comparison with phenyl acetaldehyde it has a further advantage in that it does not undergo autopolymerization and therefore does not require special stabilization. The activity of diphenyl acetaldehyde can be compared with that of phenyl acetaldehyde and p-methylphenyl acetaldehyde.

TABLE 3

Quantity of resin _____ g__ 20
Bath temperature _____ ° C__ 100
Test tube diameter _____ mm__ 20

| Regulator | Percent by wt. | Gel Time, Min. | Peak Temp., °C. | Hardening time, Min. |
|---|---|---|---|---|
| Phenylacetaldehyde | 2 | 4 | 131.5 | 17 |
|  | 1 | 5 | 123 | 20 |
| Hydratropaldehyde | 2 | 3 | 139 | 11.5 |
|  | 1 | 4 | 140 | 13 |
| Diphenylacetaldehyde | 2 | 4.5 | 127 | 11 |
|  | 1 | 6 | 114.5 | 12 |
| p-Methylphenylacetaldehyde | 2 | 4.5 | 131.5 | 17 |
|  | 1 | 5 | 129.5 | 20 |
| p-Chlorophenylacetaldehyde | 2 |  |  |  |
|  | 1 | 23.5 | 108 | 40 |
| p-Methoxyphenylacetaldehyde | 2 | 14.5 | 113 | 28 |
|  | 1 | 37.5 | 112.8 | 44 |
| 2,4,6-trimethylphenylacetaldehyde | 2 | 14.5 | 110 | 25 |
|  | 1 | 32 | 106.5 | 45 |
| Hydrocinnamicaldehyde | 2 | 17 | 117 | 31 |
|  | 1 |  |  |  |

Although 80° C. is an optimum bath temperature for the production of a uniform polymerization, a bath temperature of 100° C. was employed for the tests tabulated in such table to save time while illustrating the different activities of the various aldehydes. Disregarding the fact that the manner in which the starting materials (precondensates) have been prepared, the mixing proportions and the state of the starting materials have a certain influence on gel and hardening times and the peak temperatures, it can be ascertained from the values in such table that the concentration of the regulator employed has less influence upon the gel and hardening times than on the peak temperatures.

As indicated above, it is not only possible to employ mixtures of various phenyl acetaldehydes but also to employ such phenyl acetaldehydes in conjunction with peroxides, especially benzoyl and lauroyl peroxides. With such combinations it may be possible to secure shorter gel and hardening times. Such times can be shorter than would be obtained with two times the equivalent quantity of a single catalyst type. In contrast thereto benzaldehyde in combination with benzoyl peroxide has a weak retarding action.

The accelerating action of the combination of hydratropaldehyde and benzoyl peroxide is illustrated in the following Tables 4 and 5.

TABLE 4

Polyester—same as used in FIGS. 1–5 in styrene
    Quantity of resin _____ g__ 20
    Test tube diameter _____ mm__ 20
    Bath temperature _____ ° C__ 80

| Catalyst or Regulator | Percent by wt. | Mol | Gel time, Min. | Peak Temp., °C. | Hardening time, Min. |
|---|---|---|---|---|---|
| Hydratropaldehyde | 2 | 0.003 | 6.5 | 94.5 | 22 |
|  | 1 | 0.0015 | 10 | 92 | 39 |
|  | 0.5 | 0.00075 | 20 | 89 | 36 |
| Benzoylperoxide | 1.8 | 0.0015 | 5.75 | 198 | 8.5 |
|  | 0.9 | 0.00075 | 7.5 | 194.5 | 10.5 |
| Hydratropaldehyde plus Benzoylperoxide | 1 / 0.9 | 0.0015 / 0.00075 | 4.75 | 181 | 8 |
| Hydratropaldehyde plus Benzoylperoxide | 1 / 0.15 | 0.00015 | 9.5 | 137 | 15.5 |

When diphenyl acetaldehyde and hydratropaldehyde are used as the regulators it was found that the maximum peak temperatures were reached in general at a concentration between 1 and 2% by weight whereas at lower and higher concentrations the peak temperatures became lower. This is in contrast to the action of the peroxides which previously have been employed for accelerating the copolymerization and cause higher and higher peak temperatures with increasing concentrations. Hydratropaldehyde is an especially good accelerating substance among the mono α substituted phenyl acetaldehydes. In Especially short gel and hardening times are obtained in the copolymerization of unsaturated polyester with methyl methacrylate or vinyl acetate as can be ascertained from the following Table 5.

TABLE 5

Same polyester as in FIGS. 1–5 mixed with vinyl acetate and methyl methacrylate.
    Quantity of resin _____ g__ 20
    Test tube diameter _____ mm__ 20

| Catalyst or regulator, ratio by weight | 1% by wt. Hydratropaldehyde, Minutes | 1% by wt. Benzoylperoxide, Minutes | 1% by wt. of each of Hydratropaldehyde and Benzoylperoxide, Minutes |
| --- | --- | --- | --- |
| Polyester methyl methacrylate 3:1 at 80° C | 26 | 14 | 7 |
| Polyester methylmethacrylate 5:1 at 80° C | 17 | 15 | 7 |
| Polyester vinylacetate 3:1 at 70° C | 50 | 16.5 | 8.5 |

The polymerization temperatures can vary within wide limits. It is, however, expedient to employ temperatures above room temperature in order that polymerization times which are not too long are obtained. It is especially expedient also to effect the mixture of the reaction partners, that is, the compounds to be polymerized with the polymerization regulator, at elevated temperatures, for example, between 30 and 120° C., preferably at about 50 to 80° C. It is, however, not necessary to employ elevated temperatures. When the length of time of hardening need not be taken into consideration the reaction partners can also be mixed at temperatures of about 30 to 40° C. and to start the copolymerization at such temperatures. The actual polymerization can be started at the same temperature or a temperature somewhat higher than the mixing temperature. The polymerization temperatures expediently are between 40 and 120° C., preferably between 60 and 100° C.

The phenyl acetaldehyde compounds according to the invention, particularly the hydratropaldehyde, are distinctly superior to benzoyl peroxide at copolymerization temperatures between about 50 and 90° C. with regard to accelerating action and the quality and appearance of the copolymerized product. Some variations may occur with reference to the temperature range depending upon the type and source of the polyester employed.

The quantity of phenyl acetaldehyde compounds employed according to the invention can be varied within wide limits. However, it is useless to employ quantities greater than are necessary. For practical reasons therefore the upper limit is about 10% by weight of the reaction mixture. In general, small quantities of over 0.1%, preferably between 0.5 to 3%, of the reaction mixture are already sufficient to effect complete curing (hardening) in short periods of time, for example, in about 3 to 30 minutes at temperatures of 50 to 100° C.

As the presence of molecular oxygen is not detrimental to the polymerization, it does not have to be carried out in a closed vessel or under a protective gas, such as nitrogen. As no special protective measures are required and open molds may be used, the process according to the invention is especially adapted for general use. For example, it may be used in the dental field, such as for the production of fillings, prostheses, artificial teeth and the like, or for the production of other shaped bodies. The shaped bodies produced with the regulators according to the invention are water clear and free of cracks. In addition, fibers, filaments, foils, bands, plates or other shaped bodies may be produced therefrom by hot shaping procedures. Also, fillers, dyes, pigments, glass fibers or mineral wool can be added to the starting materials to effect coloration or improve the mechanical properties of the finished products. Furthermore, when suitably prepared, the polymerizates obtained by the process according to the invention can be used for coating purposes or the starting materials can be used for so-called two component lacquers.

The following examples will serve to illustrate several embodiments of the invention.

*Example 1*

A polyester with an acid number 20 obtained by heating 6,25 mol of maleic acid anhydride, 3.75 mol of phthalic acid anhydride and 10 mol of diethylene glycol was mixed at 50° C. with 30% by weight of styrene and 0.5% by weight of phenyl acetaldehyde and then heated for 60 minutes to 80° C. The gelation began after about 15 minutes and the temperature rose during the copolymerization to 90° C. The polymerization product solidified after 60 minutes.

*Example 2*

100 parts by weight of a polyester obtained by heating 1 mol of maleic acid anhydride, 1.6 mol of phthalic acid anhydride, 1.6 mol of ethylene glycol and 1 mol of diethylene glycol were mixed with 30 parts by weight of styrene and 1 part by weight of phenyl acetaldehyde at 50° C. and then heated to 80° C. The gelation began after 8.5 minutes and during the copolymerization the peak temperature was only 85° C. Complete curing was achieved after 60 minutes.

*Example 3*

The gel time, peak temperatures and curing time obtained with an analogous polyester-styrene mixture prepared according to Example 2 with various phenyl acetaldehyde compounds at a bath temperature of 100° C. with 20 g. batches in test tubes 20 mm. in diameter are given in the following Table 6:

TABLE 6

| Catalyst | Percent by wt. | Gel Time, Min. | Peak Temp., ° C. | Curing Time, Min. |
| --- | --- | --- | --- | --- |
| Phenylacetaldehyde | 2 | 4 | 131.5 | 17 |
|  | 1 | 5 | 123 | 20 |
| p-Methylphenylacetaldehyde | 2 | 4.5 | 131.5 | 17 |
|  | 1 | 5 | 129.5 | 20 |
| p-Methoxyphenylacetaldehyde | 2 | 14.5 | 113 | 28 |
|  | 1 | 37.5 | 112.8 | 44 |
| 2.4.6-trimethylphenylacet-aldehyde | 2 | 14.5 | 110 | 25 |
|  | 1 | 32 | 106.5 | 45 |
| p-Chlorophenylacetaldehyde | 1 | 23.5 | 108 | 40 |

Example 4

20 g. samples of a polyester styrene solution having an acid number of 31 and containing 1 mol maleic acid per 409 g. polyester styrene solution (same polyester styrene solution as concerned in FIGS. 6 and 7) were copolymerized in test tubes 20 mm. in diameter in oil baths maintained at 70 and 80° C. using 0.5, 1.0 and 2% by weight of hydratropaldehyde. In comparison further samples were copolymerized using 0.5, 1.0 and 2% of benzoyl peroxide. The course of the temperature in the polymerizing mixtures is given in FIGS. 6 and 7. As can be seen from such figures the peak temperatures reached using hydratropaldehyde are up to 111.5° C. lower than those reached with benzoyl peroxide.

The following table gives the gel times, peak temperatures, hardening times, as well as the appearance of the polymerized products of the various samples.

TABLE 7

| Catalyst or regulator | Bath Temp., ° C. | Gel Time, Min. | Peak Temp., ° C. | Hardening Time, Min. | Appearance |
|---|---|---|---|---|---|
| 2% Hydratropaldehyde | 70 | 6.5 | 100.5 | 25 | Crack free, smooth surface. |
| 1% Hydratropaldehyde | 70 | 22 | 90 | 40 | Do. |
| 0.5% Hydratropaldehyde | 70 | 45 | 85 | 55 | Do. |
| 2% Benzoyl-peroxide | 70 | 11.75 | 212 | 13.5 | Strongly cracked, brittle. |
| 1% Benzoyl-peroxide | 70 | 17.75 | 198 | 21.25 | Do. |
| 0.5% Benzoyl-peroxide | 70 | 32 | 178 | 38 | Crack free, rough surface. |
| 2% Hydratropaldehyde | 80 | 3.5 | 138 | 14 | Crack free, smooth surface. |
| 1% Hydratropaldehyde | 80 | 13.5 | 139 | 22.5 | Do. |
| 0.5% Hydratropaldehyde | 80 | 22 | 115 | 33 | Do. |
| 2% Benzoylperoxide | 80 | 5.5 | 228 | 7 | Strongly cracked, brittle. |
| 1% Benzoylperoxide | 80 | 7.75 | 218 | 10 | Do. |
| 0.5% Benzoylperoxide | 80 | 11.5 | 210 | 14.25 | Do. |

As can be seen from such table shorter gel times are obtained with hydratropaldehyde in quantities between 1 and 2% by weight than with benzoyl peroxide. While all polymerizates obtained with hydratropaldehyde were crack free and had a smooth surface, all those obtained with benzoyl peroxide with the exception of the sample employing 0.5% at a bath temperature of 70° C. were cracked brittle products. Even though the polymerization was not carried out under nitrogen, the products cured completely even at the surfaces.

Example 5

20 g. samples of a mixture of polyester styrene solution with an acid number of 17.2 and a styrene content of 33% (same polyester styrene solution as concerned in FIGS. 1–5) were copolymerized in test tubes 20 mm. in diameter in an oil bath maintained at 100° C. using 1% and 2% by weight of various phenyl acetaldehyde compounds according to the invention. FIG. 8 shows the exotherm temperature curves obtained with the samples using 1% of the aldehyde compound. It can be seen from such curves that hydratropaldehyde is the most active regulator followed by phenyl acetaldehyde, p-methylphenyl acetaldehyde and diphenyl acetaldehyde.

The following table gives the gel times, peak temperatures and hardening times observed with the various samples.

TABLE 8

| Regulator | Gel time, Min. | Peak Temp., ° C | Hardening time, Min. |
|---|---|---|---|
| 2% Phenylacetaldehyde | 4 | 131.5 | 17 |
| 1% Phenylacetaldehyde | 5 | 123 | 20 |
| 2% Hydratropaldehyde | 3 | 139 | 11.5 |
| 1% Hydratropaldehyde | 4 | 140 | 13 |
| 2% Diphenylacetaldehyde | 4.5 | 127 | 11 |
| 1% Diphenylacetaldehyde | 6 | 114.5 | 12 |
| 2% p-Methylphenylacetaldehyde | 4.5 | 131.5 | 17 |
| 1% p-Methylphenylacetaldehyde | 5 | 129.5 | 20 |
| 2% p-Methoxyphenylacetaldehyde | 14.5 | 113 | 28 |
| 1% p-Methoxyphenylacetaldehyde | 37.5 | 112.8 | 44 |

The course of the temperature during the polymerization with diphenyl acetaldehyde is particularly noteworthy as with short gel and hardening times peak temperatures of only 127° C. and 114.5° C. were reached.

Example 6

20 g. samples of the same polyester styrene solution as used in Example 5 were copolymerized in test tubes 20 mm. in diameter in an oil bath maintained at 100° C. using quantities of hydratropaldehyde between 0.25 and 8% by weight. FIG. 9 shows the exotherm curves obtained with the various samples. As can be seen, a maximum peak temperature is reached with quantities of the regulator between 1 and 2% by weight. As has already been indicated, this is contrary to what occurs in polymerizations employing benzoyl peroxide as a catalyst in which the greater the quantity of peroxide used the higher the peak temperature. FIGS. 10 and 11 show the gel times and peak temperatures as a function of the quantity of hydratropaldehyde employed.

Example 7

20 g. samples of 70% by weight solution of a polyester obtained from maleic acid, orthophthalic acid and propylene glycol 1,2 in a molar proportion of 1:1:2 and having an acid number of 20 in styrene stabilized with 0.01% of hydroquinone were copolymerized at a bath temperature of 80° C. with phenyl acetaldehyde, benzoyl peroxide and lauroyl peroxide, as well as combinations thereof. In addition, plates 10 x 15 cm., 3.5 mm. thick were also produced to determine the mechanical properties of the polymerizates.

The following table gives the gel and hardening times observed, as well as the hardness and impact and binding strengths attained.

TABLE 9

| Catalyst or regulator | Gel Time, Min. | Hardening time, Min. | Mechanical properties of a plate 3.5 mm. thick after 1 day's storage at room temperature | | |
|---|---|---|---|---|---|
| | | | Hardness o/tr | Impact Strength, kg cm./cm.² | Binding Strength, kg./cm.² |
| 1% Phenylacetaldehyde | 21 | 31 | 23.5 | 13.8 | 1,160 |
| 2% Benzoylperoxide | 38 | 44 | 25.1 | 3.7 | 1,370 |
| 2% Lauroylperoxide | 22 | 26 | 24.5 | 6.2 | 885 |
| 1% Phenylacetaldehyde plus 1% Benzoylperoxide | 11 | 13 | 22.2 | 5.5 | 1,170 |
| 1% Phenylacetaldehyde plus 1% Lauroylperoxide | 4 | 14 | 22.3 | 2.1 | 665 |

The hardness was measured with a Wolpert-Mikrotestor (diamond pyramide of 136° at 100 g. load).

The impact strength was measured with a Dynstat apparatus No. 573 according to DIN 53 453.

The binding strength was measured with a Dynstat apparatus No. 573 according to DIN 53 452.

As can be seen from such table the gel and hardening times when using phenyl acetaldehyde were shorter than when double the quantities of the peroxides indicated were used. The impact strength obtained using 1% by weight of phenyl acetaldehyde was 122% and 273% higher respectively than when 2% of lauroyl and 2% of benzoyl peroxide were used. While the combinations of phenyl acetaldehyde with the peroxides gave very short gel and hardening times, no noticeable improvement in the mechanical properties were observed.

*Example 8*

20 g. samples of the same polyester styrene solution as in Example 5 were copolymerized in test tubes 20 mm. in diameter at a bath temperature of 80° C. with hydratropaldehyde, benzoyl peroxide and a combination of both of these accelerators. As can be seen from FIG. 12 and the following table, results were obtained similar to those in Example 7, namely, shorter gel and hardening times with combined use of the accelerators and high peak temperatures but no improvement in the mechanical properties.

TABLE 10

| Catalyst or regulator | Percent by wt. | Mol | Gel Time, Min. | Peak Temp., °C | Hardening time, Min. |
|---|---|---|---|---|---|
| Hydratropaldehyde | 2 | 0.003 | 6.5 | 94.5 | 22 |
| Do | 1 | 0.0015 | 10 | 92 | 39 |
| Benzoylperoxide | 1.8 | 0.0015 | 5.75 | 193 | 8.5 |
| Do | 0.9 | 0.00075 | 7.5 | 194.5 | 10.5 |
| Hydratropaldehyde Plus Benzoylperoxide | 1 / 0.9 | 0.0015 / 0.00075 | 4.75 | 181 | 8 |
| Hydratropaldehyde Plus Benzoylperoxide | 1 / 0.15 | 0.0015 / 0.000125 | 9.75 | 137 | 15.5 |

*Example 9*

5 parts by weight of a polyester obtained by heating 1 mol of maleic acid anhydride, 1.6 mol of phthalic anhydride, 1.6 mol of ethylene glycol and 1 mol of diethylene glycol were dissolved in 1 part by weight of methyl methacrylate at 60° C. and then 20 g. samples thereof copolymerized in test tubes 20 mm. in diameter at a bath temperature of 80° C. causing hydratropaldehyde, benzoyl peroxide and a combination of such accelerators.

As can be seen from the following table the gel times with hydratropaldehyde and benzoyl peroxide are very close whereas when used together a substantially shorter gel time is attained. The products, some of which were slightly turbid, were hard products.

TABLE 11

| Catalyst or regulator | Gel Time, Min. | Appearance |
|---|---|---|
| 1% Hydratropaldehyde | 17 | Clear hard polymer. |
| 1% Benzoylperoxide | 15 | Slightly turbid hard polymer. |
| 1% Hydratropaldehyde plus 1% Benzoylperoxide. | 7 | Slightly turbid hard polymer. |

We claim:

1. In a process for the copolymerization of unsaturated polyester resins obtained from polycarboxylic acids and polyhydric alcohols, at least one of which components is ethylenically unsaturated, and liquid ethylenically unsaturated polymerizable monomers with a polymerization regulator, the step which comprises carrying out such copolymerization of the unsaturated polyester resin with the ethylenically unsaturated monomer in contact with a phenyl acetaldehyde compound of the formula $$\text{Ar—CH—CHO}$$
$$|$$
$$\text{R}$$

wherein Ar is selected from the group consisting of phenyl, alkyl substituted phenyl, alkyloxy substituted phenyl and halogen substituted phenyl and R is selected from the group consisting of hydrogen, alkyl and phenyl as the polymerization regulator.

2. The process of claim 1 in which said phenyl acetaldehyde compound is phenyl acetaldehyde.

3. The process of claim 1 in which said phenyl acetaldehyde is hydratropaldehyde.

4. The process of claim 1 in which said phenyl acetaldehyde compound is diphenyl acetaldehyde.

5. The process of claim 1 in which said phenyl acetaldehyde is p-methylphenyl acetaldehyde.

6. The process of claim 1 in which a combination of hydrotropaldehyde and benzoyl peroxide is used.

7. The process of claim 1 in which the quantity of phenyl acetaldehyde compound employed is between 0.1 and 10% by weight of the reaction mixture.

8. The process of claim 1 in which the quantity of phenyl acetaldehyde compound employed is between 0.5 and 3% by weight of the reaction mixture.

9. The process of claim 1 in which said copolymerization is started at 30 to 120° C.

10. The process of claim 1 in which said copolymerization is started at 50 to 80° C.

11. The process of claim 1 in which a combination of the phenyl acetaldehyde compound and an organic peroxidic polymerization catalyst is used.

References Cited by the Examiner

UNITED STATES PATENTS 2,944,994  7/1960  Singleton et al. _____ 260—861
2,961,430  11/1960  Davis et al. _____ 260—861

FOREIGN PATENTS 603,324  6/1948  Great Britain.
735,488  8/1955  Great Britain.

MURRAY TILLMAN, *Primary Examiner.*

LEON J. BERCOVITZ, *Examiner.*